United States Patent
Tsuruoka et al.

[11] Patent Number: 5,986,007
[45] Date of Patent: Nov. 16, 1999

[54] POLYOLEFINIC RESIN AND A RESIN COMPOSITION COMPRISING SAID RESIN

[75] Inventors: Masayuki Tsuruoka; Akira Tanaka; Masaru Nakagawa, all of Ichihara, Japan

[73] Assignee: Idemitsu Petrochemical Co., Ltd., Tokyo, Japan

[21] Appl. No.: 09/063,004

[22] Filed: Apr. 20, 1998

Related U.S. Application Data

[62] Division of application No. 08/755,151, Nov. 25, 1996, Pat. No. 5,777,056, which is a continuation of application No. 08/632,130, Apr. 15, 1996, abandoned, which is a continuation of application No. 08/536,678, Sep. 29, 1995, abandoned, which is a continuation of application No. 08/387,379, Feb. 13, 1995, abandoned, which is a continuation of application No. 08/171,159, Dec. 22, 1993, abandoned.

[30] Foreign Application Priority Data

Dec. 25, 1992 [JP] Japan .................................. 4-345640
Dec. 25, 1992 [JP] Japan .................................. 4-345641

[51] Int. Cl.$^6$ ............................. C08L 23/12; C08L 23/14
[52] U.S. Cl. ......................... 525/240; 525/247; 525/323
[58] Field of Search .................................. 525/240, 247, 525/323

[56] References Cited

U.S. PATENT DOCUMENTS

| | | |
|---|---|---|
| 4,329,256 | 5/1982 | Rust et al. . |
| 4,946,898 | 8/1990 | Kasahara et al. . |
| 5,322,902 | 6/1994 | Schreck et al. . |
| 5,556,820 | 9/1996 | Funabashi et al. . |

FOREIGN PATENT DOCUMENTS

| | | |
|---|---|---|
| 096 968 | 12/1983 | European Pat. Off. . |
| 119 508 | 9/1984 | European Pat. Off. . |
| 316 692 | 5/1989 | European Pat. Off. . |
| 433 989 | 6/1991 | European Pat. Off. . |
| 455 813 | 11/1991 | European Pat. Off. . |
| 455813 | 11/1991 | European Pat. Off. . |
| 63-243106 | 10/1988 | Japan . |
| 3-234708 | 10/1991 | Japan . |

*Primary Examiner*—David W. Wu
*Attorney, Agent, or Firm*—Oblon, Spivak McClelland, Maier & Neustadt, P.C.

[57] ABSTRACT

A propylenic resin which is a homopolymer of propylene or a copolymer of propylene, has (i) intrinsic viscosity [η] measured in decaline at the temperature of 135° C. in the range of 0.5 to 10 deciliter/g and (ii) content of insoluble fraction in boiling n-heptane (W) in the range of 10 to 99 weight % and shows (iii) relation between relaxation time of rubber component measured by pulse NMR at the temperature of 30° C. [$T_{2H}^R(30)$: μs], relaxation time of rubber component measured by pulse NMR at the temperature of 80° C. [$T_{2H}^R(80)$: μs] and the content of insoluble fraction in boiling n-heptane (W) satisfying the following equations:

$$T_{2H}^R(80) \leq 670 - 2.2 \times W$$

$$T_{2H}^R(80)/T_{2H}^R(30) \leq 8.8 + 0.086 \times W$$

and a propylenic resin composition comprising (A) 10 to 95 weight % of the propylenic resin, particularly a propylenic resin which is at least one kind selected from a homopolymer of propylene and copolymers of propylene containing 4 mol % or less of other olefinic units, and (B) 90 to 5 weight % of a propylenic random copolymer having intrinsic viscosity [η] measured in decaline at the temperature of 135° C. in the range of 0.5 to 10 deciliter/g and containing 10 to 80 mol % of olefinic units other than the propylenic unit are disclosed. The polyolefinic resin and the composition have high heat resistance and excellent mechanical properties in a wide range of modulus, show small temperature dependence of the mechanical properties and do not cause stickiness on the surface of molded articles.

7 Claims, No Drawings

POLYOLEFINIC RESIN AND A RESIN COMPOSITION COMPRISING SAID RESIN

This application is a Division of application Ser. No. 08/755,151, filed on Nov. 25, 1996, now U.S. Pat. No. 5,777,056 which is a continuation of application Ser. No. 08/632,130, filed on Apr. 15, 1996, abandoned, which is a continuation of application Ser. No. 08/536,678, filed on Sep. 29, 1995, abandoned, which is a continuation of application Ser. No. 08/387,379, filed on Feb. 13, 1995, abandoned, which is a continuation of application Ser. No. 08/171,159, filed on Dec. 22, 1993, abandoned.

BACKGROUND OF THE INVENTION

1. Field of the Invention

The present invention relates to a polyolefinic resin and a composition comprising said resin, particularly a propylenic resin composition. More particularly, it relates to a polyolefinic resin and a composition comprising said resin having high heat resistance and excellent mechanical properties in a wide range of modulus, showing small temperature dependence of the mechanical properties and not causing stickiness on the surface of molded articles.

2. Description of the Related Arts

A polyolefinic resin is required to have a modulus varied in a wide range depending on application. Design of the resin, such as suitable selection of kind of olefin, was heretofore adjusted to satisfy the requirement for the wide range.

However, particularly when modulus of the resin is low, problems that characteristic mechanical properties of the resin are deteriorated and that stickiness of the surface of molded articles that is considered to be caused by the low molecular weight of the resin cannot be avoided are found depending on the temperature of application.

It is known that an excellent resin having a good balance of stiffness and impact strength at low temperature can be made of polypropylene resin in the form of block copolymer. However, an extremely large amount of a comonomer has to be contained in the copolymer to achieve very high impact strength at low temperature. It is inevitable that surface properties and heat resistance are significantly deteriorated by the extreme increase of the content of the comonomer even though impact strength is increased. Thus, improvement of these properties has been desired.

The present inventors developed soft polypropylene resins having specific structures before (Japanese Patent Application Laid Open Nos. 1991-14851 and 1991-168234). However, although these polypropylene resins have excellent mechanical properties as thermoplastic elastomers and heat resistance improved to some degree, improvement on (1) stickiness at the surface of polymer powder and molded articles during the production processes and (2) change of mechanical properties depending on temperature has been desired.

SUMMARY OF THE INVENTION

Thus, the present invention has an object of providing a polyolefinic resin having excellent mechanical properties in a wide range of modulus, showing small temperature dependence of the mechanical properties and not causing stickiness on the surface of molded articles and a composition comprising said resin.

Extensive studies were undertaken by the present inventors to develop the polyolefinic resin having the desirable properties described above and it was discovered that the object can be achieved by a homopolymer a olefin or a copolymer of olefins having a specific value of intrinsic viscosity and a specific content of insoluble fraction in boiling n-heptane and showing a specific relation between values of relaxation time of rubber component measured by pulse NMR at 30° C. and at 80° C. and the content of insoluble fraction in boiling n-heptane and by a composition comprising the homopolymer or the copolymer. The present invention was completed on the basis of the discovery.

Thus, the present invention provides a polyolefinic resin which is a homopolymer of an olefin or a copolymer of olefins, has (i) intrinsic viscosity [η] measured in decaline at the temperature of 135° C. in the range of 0.5 to 10 deciliter/g and (ii) content of insoluble fraction in boiling n-heptane (W) in the range of 10 to 99 weight % and shows (iii) relation between relaxation time of rubber component measured by pulse NMR at the temperature of 30° C. [$T_{2H}^R(30)$: μs], relaxation time of rubber component measured by pulse NMR at the temperature of 80° C. [$T_{2H}^R(80)$: μs] and the content of insoluble fraction in boiling n-heptane (W) satisfying the following equations:

$$T_{2H}^R(80) \leq 670-2.2 \times W$$

$$T_{2H}^R(80)/T_{2H}^R(30) \leq 8.8+0.086 \times W;$$

and
a propylenic resin composition comprising (A) 10 to 95 weight % of at least one kind selected from a homopolymer of propylene and copolymers of propylene containing 4 mol % or less of other olefinic units having (i) intrinsic viscosity [η] measured in decaline at the temperature of 135° C. in the range of 0.5 to 10 deciliter/g and (ii) content of insoluble fraction in boiling n-heptane (W) in the range of 10 to 99 weight % and showing (iii) relation between relaxation time of rubber component measured by pulse NMR at the temperature of 30° C. [$T_{2H}^R(30)$: μs], relaxation time of rubber component measured by pulse NMR at the temperature of 80° C. [$T_{2H}^R(80)$: μs] and the content of insoluble fraction in boiling n-heptane (W) satisfying the following equations:

$$T_{2H}^R(80) \leq 670-2.2 \times W$$

$$T_{2H}^R(80)/T_{2H}^R(30) \leq 8.8+0.086 \times W$$

and (B) 90 to 5 weight % of a propylenic random copolymer having intrinsic viscosity [η] measured in decaline at the temperature of 135° C. in the range of 0.5 to 10 deciliter/g and containing 10 to 80 mol % of olefinic units other than the propylenic unit.

Other and further objects, features and advantages of the invention will appear more fully from the following description.

DESCRIPTION OF PREFERRED EMBODIMENTS

It is necessary that the polyolefinic resin of the present invention has intrinsic viscosity [η] measured in decaline at the temperature of 135° C. in the range of 0.5 to 10 deciliter/g and preferably in the range of 1.0 to 9.0 deciliter/g. When the intrinsic viscosity [η] is lower than 0.5 deciliter/g, mechanical properties are insufficient. When the intrinsic viscosity is higher than 10 deciliter/g, moldability is inferior. It is also necessary that the polyolefinic resin has content of insoluble fraction in boiling n-heptane (W) in the range of 10 to 99 weight % and preferably in the range of 20 to 99 weight %. When the content of insoluble fraction is out of the specified range, the object of the present invention is not achieved sufficiently. The content (W) is a value expressed by weight fraction of the fraction insoluble in boiling n-heptane which is obtained as the amount of residue after extraction of the polyolefinic resin with boiling n-heptane for 6 hours by a Soxhlet extractor.

Further, it is necessary that the polyolefinic resin of the present invention shows the relation between relaxation time of rubber component measured by pulse NMR at the temperature of 30° C. $[T_{2H}^R(30): \mu s]$, relaxation time of rubber component measured by pulse NMR at the temperature of 80° C. $[T_{2H}^R(80): \mu s]$ and the content of insoluble fraction in boiling n-heptane (W) satisfying the following equations:

$$T_{2H}^R(80) \leq 670 - 2.2 \times W$$

$$T_{2H}^R(80)/T_{2H}^R(30) \leq 8.8 + 0.086 \times W.$$

The object of the present invention is not achieved when the relation described above is not satisfied.

The relaxation time of rubber component by pulse NMR can be measured by using a CXP-90 NMR apparatus manufactured by Nippon Bruker Co., Ltd., at the measuring frequency of 90.1 MHz with $^1H$ as the measuring nucleus according to the solid echo method on measuring pulse series. Observed pulse width is set at 2.0 $\mu$sec and waiting time before the next pulse after observation of FID (free induction damping) is 5 seconds. Number of accumulation is 300. The FID is analyzed by the following method.

(1) Method of Analysis of FID at the Temperature of 30° C.

The value of FID measured by the method described above, $M_{exp}(t)$, is optimized with respect to $M_{cal}(t)$ obtained by the following equation by using the non-linear least square method with application of the modified Malcat method:

$$M_{cal}(t) = M_0^{C+G} \exp[(t/T_{2H}^{C+G})^2 2] + M_0^R \exp(t/T_{2H}^R)$$

wherein R, G and C are suffixes showing an amorphous component with rubbery molecular property, a glassy amorphous component and a crystalline component, respectively. For the optimization, $M_0^{C+G}$, $M_0^R$, $T_{2H}^{C+G}$ and $T_{2H}^R$ are used as variables. The initial condition is set as:

$$T_{2H}^R > 3T_{2H}^{C+G} \text{ and } 1 \mu s < T_{2H}^{C+G} < 15 \mu s.$$

(2) Method of Analysis of FID at the Temperature of 80° C.

The value of FID, $M_{exp}(t)$, is optimized with respect to $M_{cal}(t)$ obtained by the following equation by using the nonlinear least square method with application of the modified Malcat method:

$$M_{cal}(t) = M_0^C \exp[(t/T_{2H}^C)^2/2] + M_0^G \exp(t/T_{2H}^G) + M_0^R \exp(t/T_{2H}^R)$$

wherein the suffixes have the same meaning as the above. For the optimization, $M_0^C$, $M_0^G$, $M_0^R$, $T_{2H}^C$, $T_{2H}^G$ and $T_{2H}^R$ are used as variables.

The polyolefinic resin of the present invention can be prepared by homopolymerization of an olefin or copolymerization of olefins in the presence of a catalyst system comprising (a) a solid component constituted with (i) a solid catalyst component containing magnesium, titanium, a halogen atom and an electron donor and (ii) crystalline polyolefin used according to necessity, (b) an organoaluminum compound, (c) an aromatic compound containing alkoxy group represented by the following general formula (I):

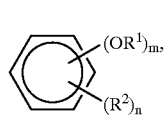

(I)

wherein $R^1$ is an alkyl group having 1 to 20 carbon atoms, $R^2$ is an hydrocarbon group having 1 to 10 carbon atoms, a hydroxyl group or a nitro group, m is an integer of 1 to 6 and n is an integer of 0 to (6-m), and (d) an electron donating compound used according to necessity.

The solid component (a) is constituted with (i) a solid catalyst component containing magnesium, titanium, a halogen atom and an electron donor and (ii) crystalline polyolefin used according to necessity. The solid catalyst component (i) contains magnesium, titanium, a halogen atom and an electron donor as the essential components thereof and can be prepared by bringing a magnesium compound, a titanium compound and an electron donor into contact with each other. In this case, the halogen atom is contained in the magnesium compound and/or the titanium compound used as a halogenated compound.

Examples of the magnesium compound are: magnesium dihalides, such as magnesium chloride and the like; magnesium oxide; magnesium hydroxide; hydrotalcite; magnesium salts of carboxylic acids; alkoxymagnesiums, such as diethoxymagnesium and the like; allyloxymagnesium; alkoxymagnesium halides; allyloxymagnesium halides; alkylmagnesiums, such as ethylbutylmagnesium and the like; alkylmagnesium halides; reaction products of organomagnesium compounds and electron donors, halosilanes, alkoxysilanes, silanols, aluminum compounds or the like; and the like magnesium compounds. Among them, magnesium halides, alkoxymagnesiums, alkylmagnesiums and alkylmagnesium halides are preferable. The magnesium compound may be used singly or as a combination of two or more kinds.

Reaction product of metallic magnesium, a halogen and an alcohol can also be used as the magnesium compound. The metallic magnesium used in this reaction is not particularly limited and metallic magnesium of desired form, such as granular form, ribbon form, powder form and the like forms, can be used. Surface condition of the metallic magnesium is not particularly limited and it is preferred that no coating layer, such as coating layer of magnesium oxide, is formed on the surface.

Any kind of alcohol can be used and a lower alcohol having 1 to 6 carbon atoms is preferable. Ethanol is particularly preferable because it provides a solid catalyst component that remarkably enhances exhibition of the catalytic ability. Purity of the alcohol and content of water in the alcohol are not particularly limited either. However, the content of water in the alcohol is preferably 1 weight % or less, particularly preferably 2000 ppm or less, because magnesium hydroxide is formed on the surface of the metallic magnesium when an alcohol containing a larger amount of water is used. Lower content of water is more preferable.

Kind of halogen or kind of a compound containing halogen is not particularly limited and any kind of compound containing a halogen atom in the molecule can be used. Although kind of halogen atom is not particularly limited, chlorine, bromine and iodine are preferably used and iodine is particularly preferably used. Among the compounds containing halogen, metal compounds containing halogen are preferable. Condition, form, size and the like of the halogen or the compound containing halogen are not particularly limited and can be selected according to desire. For example, the halogen or the compound containing halogen can be used in the form of an alcoholic solution (such as ethanol solution).

Amount of the alcohol used in the reaction is selected in the range of 2 to 100 mol, preferably in the range of 5 to 50 mol, based on 1 mol of the metallic magnesium. When the amount of the alcohol is more than the specified range, a magnesium compound having favorable morphology is less likely to be obtained. When the amount is less than the specified range, there arises the possibility that the reaction with the metallic magnesium does not proceed smoothly.

Amount of the halogen or the compound containing halogen used in the reaction is generally 0.0001 g atom or more, preferably 0.0005 g atom or more and more preferably 0.001 g atom or more based on 1 mol of the metallic magnesium. When the amount is less than 0.0001 g atom, amount of supported catalyst species, catalytic activity, stereoregulating ability and morphology of the formed polymer are inferior when the magnesium compound obtained is used without pulverizing. Thus, the process of pulverization is indispensable in this condition and the amount is not preferable. It is possible to control the particle size of the magnesium compound obtained as desired by suitably selecting the amount of the halogen used.

The reaction of the metallic magnesium, the alcohol and the halogen or the compound containing halogen can be conducted according to conventional methods. In an example of such methods, the metallic magnesium, the alcohol and the halogen or the compound containing halogen are brought into reaction with each other under the refluxing condition generally for 20 to 30 hours until generation of hydrogen gas ceased to be observed to obtain the desired magnesium compound. More specifically, when iodine is used as the halogen, a method in which metallic magnesium and solid iodine are charged into an alcohol and the mixture is refluxed under heating, a method in which metallic magnesium is charged into an alcohol, an alcohol solution of iodine is dropped into the alcohol and then the mixture is refluxed under heating and a method in which an alcohol solution of iodine is dropped into an alcohol solution containing metallic magnesium under heating can be mentioned. It is preferred in all of the methods that the reaction is conducted under an atmosphere of an inert gas, such as nitrogen gas and argon gas, and occasionally in an inert organic medium, such as a saturated hydrocarbon like n-hexane. It is not always necessary that the whole amounts of the metallic magnesium, the alcohol and the halogen are charged into the reactor at one time at the beginning of the reaction but they may be added separately in portions. In a particularly preferred method, the whole amount of the alcohol is charged into the reactor at the beginning of the reaction and the metallic magnesium is added separately in several portions during the reaction.

When the method described above is adopted, generation of a large amount of hydrogen gas in a short time can be prevented. Thus, this method is highly preferable for safety. Size of the reactor can also be reduced by adopting this method. Furthermore, loss of the alcohol and the halogen accompanied with discharge of bubbles formed by generation of a large amount of hydrogen gas in a short time can be prevented. Number of the separate additions can be decided according to scale of the reactor. It is generally in the range of 5 to 10 when the complication of the process caused by the increased number of addition is taken into consideration. It is almost needless to mention that the reaction itself can be conducted either by a batch process or by a continuous process. As a variation of the method of preparation, it is possible to adopt a method in which a small portion of the metallic magnesium is charged into the reactor containing the whole amount of the alcohol, reaction product of this step of the reaction is separated, a small portion of the metallic magnesium is added again and this procedure is repeated.

When the magnesium compound thus obtained is used for the preparation of the solid catalyst component in the next process, the magnesium compound may be used either after drying or after filtration followed by washing with an inert solvent, such as heptane or the like. In either method, the magnesium compound can be used in the next process without pulverization or classification for adjusting the particle size distribution.

Examples of the titanium compound are: tetraalkoxytitanium, such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetaphenoxytitanium and the like; titanium tetrahalides, such as titanium tetrachloride, titanium tetrabromide, titanium tetraiodide and the like; alkoxytitanium trihalides, such as methoxytitanium trichloride, ethoxytitanium trichloride, propoxytitanium trichloride, n-butoxytitanium trichloride, ethoxytitanium tribromide and the like; dialkoxytitanium dihalides, such as dimethoxytitanium dichloride, diethoxytitanium dichloride, dipropoxytitanium dichloride, di-n-butoxytitanium dichloride, diethoxytitanium dibromide and the like; trialkoxytitanium monohalides, such as trimethoxytitanium chloride, triethoxytitanium chloride, tripropoxytitanium chloride, tri-n-butoxytitanium chloride and the like; and the like titanium compounds. Among them, titanium compounds having higher content of halogen, particularly titanium tetrachloride, are preferable. The titanium compound may be used singly or as a combination of two or more kinds.

Examples of the halogen atom are a fluorine atom, a chlorine atom, a bromine atom and an iodine atom. The halogen atom is generally contained in the magnesium compound or in the titanium compound in the form of a halogenated compound.

Examples of the electron donor are the same as those shown as examples of the electron donating compound (d) described later.

The solid catalyst component (i) can be prepared according to conventional methods (Japanese Patent Application Laid Open Nos. 1978-43094, 1980-135102, 1980-135103, 1981-18606, 1981-166205, 1982-63309, 1982-190004, 1982-300407 and 1983-47003).

The solid catalyst component (i) thus prepared generally has a composition in which atom ratio of magnesium/titanium is in the range of 2 to 100, atom ratio of halogen/titanium is in the range of 5 to 100 and mol ratio of the electron donor/titanium is in the range of 0.1 to 10.

Examples of the crystalline polyolefin (ii) used in the preparation of the solid component (a) used according to necessity are crystalline polyolefins obtained from α-olefins having 2 to 10 carbon atoms, such as polyethylene, polypropylene, polybutene, poly-4-methyl-1-pentene and the like. The crystalline polyolefin can be obtained by (1) a method in which an olefin is preliminarily polymerized in the presence of a combination of the solid catalyst component (i) described above, an organoaluminum compound and an electron donating compound used according to necessity (a method of preliminary polymerization), (2) a method in which the solid catalyst component (i) described above, an organoaluminum compound used according to necessity and an electron donating compound used according to necessity ( melting point, 100° C. or higher) are dispersed into crystalline powder of crystalline polyethylene, polypropylene or the like having uniform particle diameter (a method of dispersion) or (3) a method in which the method (1) and the method (2) are adopted in combination.

In the method of preliminary polymerization (1), atom ratio of aluminum/titanium is selected generally in the range of 0.1 to 100, preferably in the range of 0.5 to 5 and mol ratio of the electron donating compound/titanium is selected generally in the range of 0 to 50, preferably in the range of 0.1 to 2.

In the solid component (a), weight ratio of the crystalline polyolefin (ii) to the solid catalyst component (i) is selected generally in the range of 0.03 to 200 and preferably in the range of 0.10 to 50.

Examples of the organoaluminum compound used as the component (b) are compounds represented by the following general formula (II):

wherein $R^3$ is an alkyl group having 3 to 20 carbon atoms or an aryl group having 6 to 20 carbon atoms, X is a halogen atom and p is a number of 1 to 3. Preferable examples of the organoaluminum compound are: trialkylaluminums, such as triisopropylaluminum, triisobutylaluminum, trioctylaluminum and the like; dialkylaluminum monohalides, such as diethylaluminum monochloride, diisopropylaluminum monochloride, diisobutylaluminum monochloride, dioctylaluminum monochloride and the like; alkylaluminum sesquihalides, such as ethylaluminum sesquichloride and the like; and the like compounds. The organoaluminum compound may be used singly or as a combination of two or more kinds.

In the catalyst system in the present invention, an aromatic compound containing alkoxy group represented by the following general formula (I):

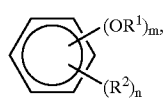

wherein $R^1$ is an alkyl group having 1 to 20 carbon atoms, $R^2$ is an hydrocarbon group having 1 to 10 carbon atoms, a hydroxyl group or a nitro group, m is an integer of 1 to 6 and n is an integer of 0 to (6−m), is used as the component (c).

Specific examples of the aromatic compound containing alkoxy group are: monoalkoxy compounds, such as m-methoxytoluene, o-methoxyphenol, m-methoxyphenol, 2-methoxy-4-methylphenol, vinylanisole, p-(1-propenyl) anisole, p-allylanisole, 1,3-bis(p-methoxyphenyl)-1-pentene, 5-allyl-2-methoxyphenol, 4-hydroxy-3-methoxybenzyl alcohol, methoxybenzyl alcohol, nitroanisole, nitrophenetole and the like; dialkoxy compounds, such as o-dimethoxybenzene, m-dimethoxybenzene, p-dimethoxybenzene, 3,4-dimethoxytoluene, 2,6-dimethoxyphenol, 1-allyl-3,4-dimethoxybenzene and the like; and trialkoxy compounds, such as 1,3,5-trimethoxybenzene, 5-allyl-1,2,3-trimethoxybenzene, 5-allyl-1,2,4-trimethoxybenzene, 1,2,3-trimethoxy-5-(1-propenyl)benzene, 1,2,4-trimethoxy-5-(1-propenyl)-benzene, 1,2,3-trimethoxybenzene, 1,2,4-trimethoxybenzene and the like. Among them, dialkoxy compounds and trialkoxy compounds are preferable. The aromatic compounds containing alkoxy group may be used singly or as a combination of two or more kinds.

In the catalyst described above, an electron donating compound is used as the component (d) according to necessity. The electron donating compound is a compound containing oxygen, nitrogen, phosphorus, sulfur, silicon or the like and considered essentially to have the function of enhancing the regularity in the polymerization of propylene.

Examples of the electron donating compound are organosilicon compounds, esters, thioesters, amines, ketones, nitriles, phosphines, ethers, thioethers, acid anhydrides, acid halides, acid amides, aldehydes, organic acids, azo compounds and the like.

Specific examples of the electron donating compound are: organosilicon compounds, such as diphenyldimethoxysilane, diphenyldiethoxysilane, dibenzyldimethoxysilane, teteramethoxysilane, tetraethoxysilane, tetraphenoxysilane, methyltrimethoxysilane, methyltriethoxysilane, methyltriphenoxysilane, phenyltrimethoxy- silane, phenyltriethoxysilane, benzyltrimethoxysilane and the like; esters of aromatic dicarboxylic acids, such as monomethyl phthalate, monoethyl phthalate, monopropyl phthalate, monobutyl phthalate, monoisobutyl phthalate, monoamyl phthalate, monoisoamyl phthalate, monomethyl terephthalate, monoethyl terephthalate, monopropyl terephthalate, monobutyl terephthalate, monoisobutyl terephthalate, dimethyl phthalate, diethyl phthalate, dipropyl phthalate, dibutyl phthalate, diisobutyl phthalate, diamyl phthalate, diisoamyl phthalate, methyl ethyl phthalate, methyl isobutyl phthalate, methyl propyl phthalate, ethyl butyl phthalate, ethyl isobutyl phthalate, ethyl propyl phthalate, propyl isobutyl phthalate, dimethyl terephthalate, diethyl terephthalate, dipropyl terephthalate, diisobutyl terephthalate, methyl ethyl terephthalate, methyl isobutyl terephthalate, methyl propyl terephthalate, ethyl butyl terephthalate, ethyl isobutyl terephthalate, ethyl propyl terephthalate, propyl isobutyl terephthalate, dimethyl isophthalate, diethyl isophthalate, dipropyl isophthalate, diisobutyl isophthalate, methyl ethyl isophthalate, methyl isobutyl isophthalate, methyl propyl isophthalate, ethyl butyl isophthalate, ethyl isobutyl isophthalate, ethyl propyl isophthalate, propyl isobutyl isophthatale and the like; monoesters, such as methyl formate, ethyl formate, methyl acetate, ethyl acetate, vinyl acetate, propyl acetate, octyl acetate, cyclohexyl acetate, ethyl propionate, methyl butyrate, ethyl butyrate, ethyl valerate, methyl chloroacetate, ethyl dichloroacetate, methyl methacrylate, ethyl crotonate, ethyl pivalate, diemethyl maleate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzate, ethyl p-butoxybenzoate, ethyl o-chlorobenzoate, ethyl naphthoate and the like; other esters, such as γ-butyrolactone, δ-valerolactone, coumarine, phthalide, ethylene carbonate and the like; organic acids, such as benzoic acid, p-oxybenzoic acid ad the like; acid anhydrides, such as succinic anhydride, benzoic anhydride, p-toluic anhydride and the like; ketones, such as acetone, methyl ethyl ketone, methyl isobutyl ketone, acetophenone, benzophenone, benzoquinone and the like; aldehydes, such as acetaldehyde, propionaldehyde, octylaldehyde, tolualdehyde, benzaldehyde, naphthylaldehyde and the like; acid halides, such as acetyl chloride, acetyl bromide, propionyl chloride, butyryl chloride, isobutyryl chloride, 2-methylpropionyl chloride, valeryl chloride, isovaleryl chloride, hexanoyl chloride, methylhexanoyl chloride, 2-ethylhexanoyl chloride, octanoyl chloride, decanoyl chloride, undecanoyl chloride, hexadecanoyl chloride, octadecanoyl chloride, benzylcarbonyl chloride, cyclohexanecarbonyl chloride, malonyl dichloride, succinyl dichloride, pentanedioleyl dichloride, hexanedioleyl dichloride, cyclohexanedicarbonyl dichloride, benzoyl chloride, benzoyl bromide, methylbenzoyl chloride, phthaloyl chloride, isophthaloyl chloride, terephthaloyl chloride, benzene-1,2,4-tricarbonyl trichloride and the like; ethers, such as methyl ether, ethyl ether, isopropyl ether, n-butyl ether, isopropyl methyl ether, isopropyl ethyl ether, t-butyl ethyl ether, t-butyl n-propyl ether, t-butyl n-butyl ether, t-amyl methyl ether, t-amyl ethyl ether, amyl ether, tetrahydrofuran, anisole, diphenyl ether, ethylene glycol butyl ether and the like; acid amides, such as acetamide, benzamide, toluamide and the like; amines, such as tribuylamine, N-N'-dimethylpiperadine, tribenzylamine, aniline, pyridine, pyrroline, tetramethylethylenediamine and the like; nitriles, such as acetonitrile, benzonitrile, tolunitrile and the like; and azo compounds in which steric hindered substituents are bonded to the azo linkage, such as 2,2'-azobis(2-methylpropane), 2,2'-azobis(2-ethylpropane) 2,2'-azobis(2-methylpentane) and the like. Among these compounds, organosilicon compounds, esters, ketones, ethers, thioethers, acid anhydrides, acid halides are preferable. Organosilicone compounds, such as diphenyldimethoxysilane, phenyltriethoxysilane and the like, diesters of aromatic dicarboxylic acids, such as di-n-butyl phthalate, diisobutyl phthalate and the like, and alkyl esters of aromatic monocarboxylic acids, such as benzoic acid, p-methoxybenzoic acid, p-ethoxybenzoic acid, toluic acid and the like, are particularly preferable. The electron donating compound may be used singly or as a combination of two or more kinds.

Amounts of the catalyst components used in the catalyst system are as following. The solid component (a) is used generally in an amount that 0.0005 to 1 mol of the titanium atom in the solid component is contained in 1 liter of the reactor. The organoaluminum compound (b) is used in an amount to make the atom ratio of aluminum/titanium generally in the range of 1 to 3000 and preferably in the range of 40 to 800. When the amount is out of the specified range, possibility that the catalyst activity is insufficient arises. The organic compound containing alkoxy group (c) is used in an amount to make the mol to the titanium atom in the solid component (a) generally in the range of 0.01 to 500 and preferably in the range of 1 to 300. When the amount is less than 0.01, there arises the possibility that physical properties of the formed polymer are inferior. When the amount is more than 500, possibility that the catalyst activity is insufficient arises.

The polyolefinic resin of the present invention can be obtained by polymerization of at least one kind of α-olefin in the presence of the catalyst system described above. It is preferred that the α-olefins used as the material is an α-olefin having 2 to 30 carbon atoms. Examples of the α-olefin are: ethylene, propylene, butene-1, pentene-1, 4-methyl-1-pentene, hexene-1, heptene-1, octene-1, nonene-1, decene-1 and the like. The α-olefin may be used singly or as a combination of two or more kinds.

Process of the polymerization is not particularly limited and slurry polymerization, gas phase polymerization, bulk polymerization, solution polymerization, suspension polymerization or the like can be adopted.

When the gas phase polymerization is adopted as the polymerization process, conditions of the polymerization are selected as following. Polymerization pressure is suitably selected generally in the range of 10 to 45 kg/cm$^2$ and preferably in the range of 20 to 30 kg/cm$^2$. Polymerization temperature is suitably selected generally in the range of 40 to 90° C. and preferably in the range of 60 to 75° C. Molecular weight of the polymer obtained can be adjusted by conventional methods, such as adjustment of concentration of hydrogen in the polymerization vessel. Polymerization time is varied depending on the kind of olefin and the polymerization temperature and cannot be generally specified. Polymerization time of 5 minutes to 10 hours is usually sufficient.

The propylenic resin composition of the present invention comprises at least one kind selected from a homopolymer of propylene and copolymers containing 4 mol % or less of other olefin units in addition to the propylene unit as the component (A). It is necessary that the homopolymer and the copolymer of propylene have intrinsic viscosity [η] measured in decaline at the temperature of 135° C. in the range of 0.5 to 10 deciliter/g and preferably in the range of 1.0 to 9.0 deciliter/g. When the intrinsic viscosity [η] is lower than 0.5 deciliter/g, mechanical properties of the polymer are deteriorated. When the intrinsic viscosity [η] is higher than 10 deciliter/g, moldability is inferior. It is also necessary that the homopolymer and the copolymer of propylene have content of insoluble fraction in boiling n-heptane (W) in the range of 10 to 99 weight % and preferably in the range of 20 to 99 weight %. When the content of insoluble fraction in boiling n-heptane is out of the specified range, the object of the present invention is not sufficiently achieved. The content (W) is a value expressed by weight fraction of the fraction insoluble in boiling n-heptane which is obtained as the amount of residue after extraction of the polyolefinic resin with boiling n-heptane for 6 hours by a Soxhlet extractor.

The propylenic resin composition of the present invention comprises a propylenic random copolymer containing 10 to 80 mol %, preferably 10 to 70 mol %, of olefinic units other than the propylene unit as the component (B). It is necessary that the propylenic random copolymer has intrinsic viscosity [η] measured in decaline at the temperature of 135° C. in the range of 0.5 to 10 deciliter/g and preferably in the range of 1.0 to 9.0 deciliter/g. When the intrinsic viscosity [η] is lower than 0.5 deciliter/g, mechanical properties of the polymer are deteriorated. When the intrinsic viscosity [η] is higher than 10 deciliter/g, moldability is inferior.

In the propylenic resin composition of the present invention, it is necessary that the propylenic resin composition contains 10 to 95 weight %, preferably 30 to 95 weight %, of the homopolymer and/or the copolymer of propylene of the component (A) and 90 to 5 weight %, preferably 70 to 5 weight %, of the propylenic random copolymer of the component (B). When the amounts of the component (A) and the component (B) are out of the specified range, the object of the present invention cannot be achieved sufficiently.

The propylenic resin composition of the present invention can be prepared, for example, by various kinds of polymerization method, such as gas phase multi-stage polymerization method, slurry multi-stage polymerization method and the like, or by a blending method.

The propylenic resin composition of the present invention can be obtained by a multi-stage polymerization method in the presence of the catalyst system described above. Order of addition of the components and number of the stage in the multi-stage polymerization method can be selected suitably according to desire. For example, homopolymerization of propylene is conducted in the first polymerization (the first stage of the polymerization) and copolymerization of ethylene and propylene or copolymerization of ethylene, propylene and a polyene can be conducted in the second or later stage of the polymerization. Examples of the polyene which can be used here are dicyclopentadiene, tricyclopentadiene and the like.

Process of the polymerization is not particularly limited and slurry polymerization, gas phase polymerization, bulk polymerization, solution polymerization, suspension polymerization or the like can be adopted.

When the propylenic resin composition is prepared by a polymerization process, an olefin or a mixture of olefins is polymerized in the presence of the catalyst system described above containing (a) the solid component constituted with (i) the solid catalyst component containing magnesium, titanium, a halogen atom and an electron donor and (ii) the crystalline polyolefin used according to necessity, (b) the organoaluminum compound, (c) the aromatic compound containing alkoxy group and represented by the general formula (I) described above and (d) the electron donating compound used according to necessity in a similar manner to the polymerization process described above.

When the polymerization is conducted by the gas phase polymerization process, polymerization pressure in the homopolymerization stage is suitably selected generally in the range of 10 to 45 kg/cm$^2$, preferably in the range of 20 to 30 kg/cm$^2$, and polymerization temperature in the same stage is suitably selected generally in the range of 40 to 90° C., preferably in the range of 60 to 75° C. Polymerization pressure in the copolymerization stage of ethylene and propylene or ethylene, propylene and a polyene is suitably selected generally in the range of 5 to 30 kg/cm$^2$, preferably in the range of 10 to 20 kg/cm$^2$, and polymerization temperature in the same stage is suitably selected generally in the range of 20 to 90° C., preferably in the range of 40 to 60° C. In either of the polymerization stages, molecular weight of the polymer can be adjusted by conventional methods, such as adjustment of concentration of hydrogen in the polymerization vessel. Molecular weight of the polymer can also be adjusted by melt mixing the polymer in the presence of an organic peroxide. Polymerization time is suitably selected in the range of 5 minutes to 10 hours.

When the polymerization is conducted, olefin or a mixture of olefins may be introduced to start the polymerization immediately after the components (a) to (d) constituting the catalyst system is mixed together in specified amounts to bring them into contact with each other or an olefin or a mixture of olefins may be introduced after the catalyst system has been aged for 0.2 to 3 hours after the catalyst components are brought into contact with each other. The catalyst components may be charged in the form of a suspension in an inert solvent, an olefin or the like.

In the present invention, finishing of the polymer after the polymerization can be conducted according to conventional methods. When the gas phase polymerization process is adopted, nitrogen stream or the like may be passed through the polymer powder discharged from the polymerization vessel after the polymerization to remove olefins contained in the polymer. The polymer may be pelletized by using an extruder according to desire. In this case, a small amount of water, alcohol or the like can be added to the polymer to deactivate the catalyst completely. When the bulk polymerization process is adopted, the polymer discharged from the polymerization vessel after the polymerization can be pelletized after the remaining monomer is completely removed.

The polyolefinic resin of the present invention has the characteristic that it has high heat resistance and excellent mechanical properties in a wide range of modulus, shows small temperature dependence of the mechanical properties and does not cause stickiness on the surface of molded articles.

The olefinic resin is favorably applied as a material for automobile parts, such as side braids, over-fenders, mud guards, soft bumpers, steering wheels, gear-shifting knobs, arm rests, console boxes, sheets and the like, a material for construction and building, a material for films and sheets and the like.

The invention will be understood more readily with reference to the following examples; however, these examples are intended to illustrate the invention and are not to be construed to limit the scope of the invention.

EXAMPLES

Example 1

(1) Preparation of a Magnesium Compound

A glass reactor (inner volume, about 6 liter) equipped with a stirrer was purged with nitrogen thoroughly and about 2430 g of ethanol, 16 g of iodine and 160 g of metallic magnesium were charged into the reactor. Reaction was conducted by heating in the refluxing condition under stirring until generation of hydrogen gas from the reaction system ceased to be observed and a solid reaction product was obtained. The reaction fluid containing the solid reaction product was dried under the reduced pressure to obtain a magnesium compound.

(2) Preparation of a Solid Catalyst Component (a)

Into a three-necked glass flask (inner volume, 500 milliliter) which had been purged with nitrogen gas thoroughly, 16 g of the magnesium compound prepared above (without pulverization), 80 milliliter of purified heptane, 2.4 milliliter of silicon tetrachloride and 2.3 milliliter of diethyl phthalate were added. While the system was kept at 90° C., 77 milliliter of titanium tetrachloride was charged under stirring. After the reaction was conducted at 110° C. for 2 hours, the solid component was separated and washed with purified heptane of 80° C. To the solid component, 122 milliliter of titanium teterachloride was added further. After the reaction was conducted at 110° C. for 2 hours, the reaction product was washed with purified heptane thoroughly to obtain a solid catalyst component (a).

(3) Gas Phase Polymerization

Into a 5 liter pressure resistant autoclave made of stainless steel, 20 g of polypropylene powder, 2.5 millimol of tri-isobutylaluminum (TIBA), 0.125 millimol of 1-allyl-3,4-dimethoxybenzene (ADMB), 0 millimol of diphenyldimethoxysilane (DPDMS) and 20 milliliter of a heptane solution containing the solid catalyst component (a) prepared above in an amount corresponding to 0.05 millimol of the titanium atom in the solid catalyst were charged. After the reaction system was evacuated for 5 minutes, the gas phase polymerization was conducted for 1.7 hours by supplying propylene gas until the total pressure became 28 kg/cm$^2$G and a polymer having an intrinsic viscosity [η] (in decaline, 135° C.) of 3.73 diciliter/g was obtained. The polymer had content of fraction insoluble in boiling n-heptane (W) of 35.0 weight %. Values of $T_{2H}^R(30)$, $T_{2H}^R(80)$ and $T_{2H}^R(80)/T_{2H}^R(30)$ were obtained with the polymer. Results are shown in Table 1.

Then, test pieces were prepared from the polymer thus obtained by press molding. Izod impact strength (according to Japanese Industrial Standard 7110), tensile modulus (according to Japanese Industrial Standard 7113) and retention of stiffness (23→60° C.) were obtained with these test pieces. Tackiness at the surface was evaluated by a functional testing. Results are shown in Table 2.

Example 2

Polymerization was conducted by using the same catalyst as that in Example 1 by the same method as that in Example 1 except that TIBA, ADMB and DPDMS in the gas phase polymerization were used in amounts of 5.0 millimol, 0.125 millimol and 0.2 millimol, respectively. The polymer obtained had content of insoluble fraction in boiling n-heptane (W) of 62.4 weight % and intrinsic viscosity [η] of 4.27 deciliter/g. Results are shown in Table 1 and Table 2.

Example 3

Polymerization was conducted by using the same catalyst as that in Example 1 by the same method as that in Example 1 except that TIBA, ADMB and DPDMS in the gas phase polymerization were used in amounts of 5.0 millimol, 0.125 millimol and 0.4 millimol, respectively. The polymer obtained had content of insoluble fraction in boiling n-heptane (W) of 81.7 weight % and intrinsic viscosity [η] of 4.90 deciliter/g. Results are shown in Table 1 and Table 2.

Example 4

Polymerization was conducted by using the same catalyst as that in Example 1 by the same method as that in Example 1 except that TIBA, ADMB and DPDMS in the gas phase polymerization were used in amounts of 5.0 millimol, 0.125 millimol and 0.5 millimol, respectively. The polymer obtained had content of insoluble fraction in boiling n-heptane (W) of 91.3 weight % and intrinsic viscosity [η] of 5.42 deciliter/g. Results are shown in Table 1 and Table 2.

Comparative Example 1

(1) Preparation of Solid Catalyst Component

Into a three-necked glass flask of 500 milliliter inner volume which had been purged thoroughly with nitrogen, 20 milliliter of purified heptane, 4 g of $Mg(OC_2H_5)_2$ (a product of Hüls Co., Germany) and 1.2 g of di-n-butyl phthalate were charged. While the system was kept at 90° C., 4 milliliter of $TiCl_4$ was dropped under stirring. Then, additional 111 milliliter of $TiCl_4$ was added and the temperature was raised to 110° C. After the reaction was conducted for 2 hours, the reaction product was washed with 100 milliliter of purified heptane of 80° C. To the solid part thus obtained, 115 milliliter of $TiCl_4$ was added and the reaction was conducted for further 2 hours at 110° C. After the reaction, the product was washed with 100 milliliter of purified heptane several times to obtain a solid catalyst component.

(2) Preparation of a Solid Component

Into a three-necked pressure resistant glass flask of 2.5 liter inner volume which had been purged thoroughly with nitrogen, 1.7 liter of purified heptane, 0.07 mol of $Al(C_2H_5)_3$, 0.05 millimol of diphenyldimethoxysilane (DPDMS) and 120 g of the solid catalyst component obtained in (1) described above were added. While the system was kept at 30° C., propylene was supplied continuously under stirring so that the inner pressure is kept at 0.5 kg/cm²G. After the reaction was continued for 1 hour, the reaction product was washed with 1 liter of purified heptane 5 times to prepare a solid component.

(3) Gas Phase Polymerization

Into a 5 liter pressure resistant autoclave made of stainless steel, 20 g of polypropylene powder, 3 millimol of $Al(C_2H_5)_3$, 0.15 millimol of ADMB, 0.23 millimol of DPDMS and 20 milliliter of a heptane solution containing 100 mg (corresponding to 0.06 millimol of the titanium atom in the solid catalyst) of the solid component prepared in (2) described above were charged. After the reaction system was evacuated for 5 minutes, the gas phase polymerization was conducted for 1.7 hours at 70° C. by supplying propylene gas until the total pressure became 28 kg/cm²G. The polymer had content of fraction insoluble in boiling n-heptane (W) of 64.9 weight % and intrinsic viscosity [η] of 3.43 diciliter/g. Results are shown in Table 1 and Table 2.

Comparative Example 2

A catalyst was prepared and polymerization was conducted by the same procedure as that in Comparative Example 1 except that content of insoluble fraction in n-heptane (W) of the polymer obtained was made 37.1 weight % by adjusting the ratio of the amounts of ADMB and DPDMS (ADMB/DPDMS) in the gas phase polymerization. Intrinsic viscosity [η] of the polymer obtained was 3.31 deciliter/g. Results are shown in Table 1 and Table 2.

Comparative Example 3

A catalyst was prepared and polymerization was conducted by the same procedure as that in Comparative Example 1 except that content of insoluble fraction in n-heptane (W) of the polymer obtained was made 76.0 weight % by adjusting the ratio of the amounts of ADMB and DPDMS (ADMB/DPDMS) in the gas phase polymerization. Intrinsic viscosity [η] of the polymer obtained was 3.98 deciliter/g. Results are shown in Table 1 and Table 2.

Comparative Example 4

A catalyst was prepared and polymerization was conducted by the same procedure as that in Comparative Example 1 except that content of insoluble fraction in n-heptane (W) of the polymer obtained was made 90.0 weight % by adjusting the ratio of the amounts of ADMB and DPDMS (ADMB/DPDMS) in the gas phase polymerization. Intrinsic viscosity [η] of the polymer obtained was 4.19 deciliter/g. Results are shown in Table 1 and Table 2.

TABLE 1

|  | [η] (dl/g) | W (wt. %) | $T_{2H}^{R}(30)$ (μs) | $T_{2H}^{R}(80)$ (μs) | $T_{2H}^{R}(80)/T_{2H}^{R}(30)$ |
|---|---|---|---|---|---|
| Example 1 | 3.73 | 35.0 | 53.0 | 583 | 11.0 |
| Example 2 | 4.27 | 62.4 | 41.9 | 520 | 12.4 |
| Example 3 | 4.90 | 81.7 | 32.2 | 475 | 14.8 |
| Example 4 | 5.42 | 91.3 | 29.3 | 450 | 15.4 |
| Comparative Example 1 | 3.43 | 64.9 | 34.0 | 560 | 16.5 |
| Comparative Example 2 | 3.31 | 37.1 | 45.0 | 600 | 13.3 |
| Comparative Example 3 | 3.98 | 76.0 | 31.7 | 540 | 17.0 |
| Comparative Example 4 | 4.19 | 90.0 | 27.0 | 490 | 18.1 |

TABLE 2

|  | Izod impact strength[1] (kg · cm/cm) | | (stiffness) tensile modulus (kg/cm²) | | retention of stiffness 23 → 60° C. (%) | stickiness of the surface[2] |
|---|---|---|---|---|---|---|
|  | 5° C. | 23° C. | 23° C. | 60° C. | | |
| Example 1 | NB | NB | 1900 | 1000 | 52.6 | ◎ |
| Example 2 | NB | NB | 4000 | 2300 | 57.5 | ◎ |

TABLE 2-continued

| | Izod impact strength[1] (kg · cm/cm) | | (stiffness) tensile modulus (kg/cm$^2$) | | retention of stiffness 23 → 60° C. (%) | stickiness of the surface[2] |
|---|---|---|---|---|---|---|
| | 5° C. | 23° C. | 23° C. | 60° C. | | |
| Example 3 | 22 | NB | 6500 | 3800 | 58.5 | ⊚ |
| Example 4 | 15 | NB | 9900 | 5900 | 59.6 | ⊚ |
| Comparative Example 1 | 9.8 | NB | 5500 | 2400 | 43.6 | x |
| Comparative Example 2 | NB | NB | 2200 | 700 | 31.8 | x |
| Comparative Example 3 | 4.3 | NB | 7800 | 3200 | 41.0 | x |
| Comparative Example 4 | 3.2 | 15 | 11500 | 5100 | 44.3 | ○ |

Notes
[1] NB: not broken
[2] ⊚: not sticky
○: slightly sticky
x: sticky

Example 5

(1) Preparation of a Magnesium Compound

A glass reactor (inner volume, about 6 liter) equipped with a stirrer was purged with nitrogen thoroughly and about 2430 g of ethanol, 16 g of iodine and 160 g of metallic magnesium were charged into the reactor. Reaction was conducted by heating in the refluxing condition under stirring until generation of hydrogen gas from the reaction system ceased to be observed and a solid reaction product was obtained. The reaction fluid containing the solid reaction product was dried under the reduced pressure to obtain a magnesium compound.

(2) Preparation of a Solid Catalyst Component (a)

Into a three-necked glass flask (inner volume, 500 milliliter) which had been purged with nitrogen gas thoroughly, 16 g of the magnesium compound prepared above (without pulverization), 80 milliliter of purified heptane, 2.4 milliliter of silicon tetrachloride and 2.3 milliliter of diethyl phthalate were added. While the system was kept at 90° C., 77 milliliter of titanium tetrachloride was charged under stirring. After the reaction was conducted at 110° C. for 2 hours, the solid component was separated and washed with purified heptane of 80° C. To the solid component, 122 milliliter of titanium tetrachloride was added further. After the reaction was conducted at 110° C. for 2 hours, the reaction product was washed with purified heptane thoroughly to obtain a solid catalyst component (a).

(3) Gas Phase Polymerization

Into a 5 liter pressure resistant autoclave made of stainless steel, 20 g of polypropylene powder, 2.5 millimol of tri-isobutylaluminum (TIBA), 0.125 millimol of 1-allyl-3,4-dimethoxybenzene (ADMB), 0 millimol of diphenyldimethoxysilane (DPDMS) and 20 milliliter of a heptane solution containing the solid catalyst component (a) prepared above in an amount corresponding to 0.05 millimol of the titanium atom in the solid catalyst were charged. After the reaction system was evacuated for 5 minutes, the gas phase polymerization was conducted for 1.7 hours by supplying propylene gas until the total pressure became 28 kg/cm$^2$G.

Then, unreacted gas in the autoclave was discharged and a small part of powder formed was taken out as a sample for analysis. Next, hydrogen gas and a mixed gas of ethylene and propylene (mol ratio, 1/1) were supplied until the pressure became 0.5 kg/cm$^2$ for hydrogen gas and 10 kg/cm$^2$ for the mixed gas and the gas phase polymerization was conducted at 50° C. for 1.0 hour. Composition and physical properties of the polymer obtained are shown in Table 3.

Example 6

Homopolymerization of propylene was conducted by using the same catalyst as that in Example 5 by the same method as that in Example 5 except that TIBA, ADMB and DPDMS in the gas phase polymerization were used in amounts of 5.0 millimol, 0.125 millimol and 0.2 millimol, respectively. Then, composition of the mixed gas and polymerization time in copolymerization were adjusted so that a copolymer having the composition shown in Table 3 could be obtained. Results are shown in Table 3.

Example 7

Homopolymerization of propylene was conducted by using the same catalyst as that in Example 5 by the same method as that in Example 5 except that TIBA, ADMB and DPDMS in the gas phase polymerization were used in amounts of 5.0 millimol, 0.125 millimol and 0.4 millimol, respectively. Then, composition of the mixed gas and polymerization time in copolymerization were adjusted so that a copolymer having the composition shown in Table 3 could be obtained. Results are shown in Table 3.

Example 8

Homopolymerization of propylene was conducted by using the same catalyst as that in Example 5 by the same method as that in Example 5 except that TIBA, ADMB and DPDMS in the gas phase polymerization were used in amounts of 5.0 millimol, 0.125 millimol and 0.5 millimol, respectively. Then, composition of the mixed gas and polymerization time in copolymerization were adjusted so that a copolymer having the composition shown in Table 3 could be obtained. Results are shown in Table 3.

Example 9

Homopolymerization of propylene was conducted by the same method as that in Example 6. In copolymerization, composition of the mixed gas and polymerization time were adjusted so that a copolymer having the composition shown in Table 3 could be obtained. Results are shown in Table 3.

Examples 10 to 12

Homopolymerization of propylene was conducted by the same method as that in Example 6. In copolymerization, composition of the mixed gas and polymerization time were adjusted so that a copolymer having the composition shown in Table 3 could be obtained. Results are shown in Table 3.

Comparative Example 5

(1) Preparation of Solid Catalyst Component

Into a three-necked glass flask of 500 milliliter inner volume which had been purged thoroughly with nitrogen, 20 milliliter of purified heptane, 4 g of Mg(OC$_2$H$_5$)2 and 1.2 g of di-n-butyl phthalate were charged. While the system was kept at 90° C., 4 milliliter of TiCl4 was dropped under stirring. Then, additional 111 milliliter of TiCl$_4$ was added and the temperature was raised to 110° C. After the reaction was conducted for 2 hours, the reaction product was washed with 100 milliliter of purified heptane of 80° C. To the solid part thus obtained, 115 milliliter of $TiCl_4$ was added and the reaction was conducted for further 2 hours at 110° C. After the reaction, the product was washed with 100 milliliter of purified heptane several times to obtain a solid catalyst component.

(2) Preparation of a Solid Component

Into a three-necked pressure resistant glass flask of 2.5 liter inner volume which had been purged thoroughly with nitrogen, 1.7 liter of purified heptane, 0.07 mol of $Al(C_2H_5)_3$, 0.05 millimol of diphenyldimethoxysilane (DPDMS) and 120 g of the solid catalyst component obtained in (1) described above were added. While the system was kept at 30° C., propylene was supplied continuously under stirring and the inner pressure was kept at 0.5 $kg/cm^2G$. After the reaction was continued for 1 hour, the reaction product was washed with 1 liter of purified heptane 5 times to prepare a solid component.

(3) Gas Phase Polymerization

Into a 5 liter pressure resistant autoclave made of stainless steel, 20 g of polypropylene powder, 3 millimol of $Al(C_2H_5)_3$, 0.15 millimol of ADMB, 0.23 millimol of DPDMS and 20 milliliter of a heptane solution containing 100 mg (corresponding to 0.06 millimol of the titanium atom in the solid catalyst) of the solid component prepared in (2) described above were charged. After the reaction system was evacuated for 5 minutes, the gas phase polymerization was effected for 1.7 hours at 70° C. by charging propylene gas until the total pressure became 28 $kg/cm^2G$.

Then, hydrogen gas and a mixed gas of ethylene and propylene (mol ratio, 1/3) were supplied until the pressure became 0.5 $kg/cm^2$ for hydrogen gas and 10 $kg/cm^2$ for the mixed gas and the gas phase polymerization was conducted at 50° C. for 1.2 hours. Results are shown in Table 3.

Comparative Examples 6 to 8

Homopolymerization and copolymerization were conducted by the same method as that in Comparative Example 5 except that content of insoluble fraction in boiling n-heptane (W) (stereo-regularity) was adjusted by the amounts of ADMB and DPDMS in the first stage of the gas phase polymerization (homopolymerization of propylene) and composition of the copolymer was adjusted by composition of the mixed gas and polymerization time in copolymerization. Results are shown in Table 3.

TABLE 3

| | composition of homopolymer of propylene | | | | |
|---|---|---|---|---|---|
| | [η] (dl/g) | W (wt. %) | $T_{2H}^R(30)$ (µs) | $T_{2H}^R(80)$ (µs) | $T_{2H}^R(80)/T_{2H}^R(30)$ |
| Example 5 | 3.7 | 35 | 52.5 | 588 | 11.2 |
| Example 6 | 4.4 | 65 | 42.3 | 520 | 12.3 |
| Example 7 | 4.8 | 80 | 31.5 | 463 | 14.7 |
| Example 8 | 5.4 | 91 | 29.5 | 454 | 15.4 |
| Example 9 | 4.3 | 62 | 41.9 | 520 | 12.4 |
| Example 10 | 4.3 | 65 | 42.2 | 522 | 12.4 |
| Example 11 | 4.2 | 63 | 42.0 | 519 | 12.4 |
| Example 12 | 4.2 | 65 | 42.3 | 521 | 12.3 |
| Comparative Example 5 | 3.4 | 38 | 45.0 | 612 | 13.6 |
| Comparative Example 6 | 3.5 | 65 | 34.0 | 558 | 16.4 |
| Comparative Example 7 | 4.0 | 75 | 31.4 | 531 | 16.9 |
| Comparative Example 8 | 4.2 | 91 | 27.3 | 494 | 18.1 |

| | composition of propylenic random copolymer | | | |
|---|---|---|---|---|
| | content of ethylene unit | | [η] | amount |
| | (wt. %) | (mol %) | (dl/g) | (wt. %) |
| Example 5 | 44 | 54 | 5.3 | 25 |
| Example 6 | 30 | 39 | 4.5 | 25 |
| Example 7 | 52 | 62 | 5.2 | 25 |
| Example 8 | 48 | 58 | 5.5 | 40 |
| Example 9 | 50 | 60 | 4.8 | 40 |
| Example 10 | 20 | 27 | 4.2 | 25 |
| Example 11 | 60 | 69 | 5.3 | 25 |
| Example 12 | 68 | 76 | 5.5 | 25 |
| Comparative Example 5 | 49 | 59 | 4.5 | 25 |
| Comparative Example 6 | 30 | 39 | 4.7 | 25 |
| Comparative Example 7 | 47 | 57 | 4.7 | 25 |
| Comparative Example 8 | 49 | 59 | 4.6 | 40 |

TABLE 3-continued

| | physical properties | | | | | | |
|---|---|---|---|---|---|---|---|
| | Izod impact strength[1] (kg · cm/cm) | | | tensile modulus (kg/cm$^2$) | | retention of stiffness 23 → 60° C. (%) | stickiness of the surface[2] |
| | −30° C. | 0° C. | 23° C. | 23° C. | 60° C. | | |
| Example 5 | NB | NB | NB | 1100 | 600 | 54.5 | ⊚ |
| Example 6 | NB | NB | NB | 2500 | 1400 | 56.0 | ⊚ |
| Example 7 | NB | NB | NB | 5000 | 2700 | 54.0 | ⊚ |
| Example 8 | NB | NB | NB | 4700 | 2600 | 55.3 | ⊚ |
| Example 9 | NB | NB | NB | 1500 | 800 | 53.3 | ⊚ |
| Example 10 | NB | NB | NB | 2400 | 1300 | 54.2 | ⊚ |
| Example 11 | NB | NB | NB | 2500 | 1400 | 56.3 | ⊚ |
| Example 12 | NB | NB | NB | 2600 | 1400 | 53.8 | ⊚ |
| Comparative Example 5 | 28.7 | NB | NB | 1800 | 800 | 44.4 | x |
| Comparative Example 6 | 15.3 | NB | NB | 3000 | 1300 | 43.3 | x |
| Comparative Example 7 | 9.5 | NB | NB | 4900 | 2300 | 46.9 | x |
| Comparative Example 8 | 18.4 | NB | NB | 4400 | 2000 | 45.4 | x |

Notes 1) and 2) are the same as those in Table 2.

While the invention has been particularly shown and described with reference to preferred embodiments thereof, it will be understood by those skilled in the art that the foregoing and other changes in form and details can be made therein without departing from the spirit and scope of the invention.

We claim:

1. A propylenic resin composition comprising (A) 10 to 95 weight % of at least one kind selected from the group consisting of a homopolymer of propylene and copolymers of propylene containing 4 mol % or less of other olefinic units having (i) intrinsic viscosity [η] measured in decaline at the temperature of 135° C. in the range of 0.5 to 10 deciliter/g and (ii) content of insoluble fraction in boiling n-heptane (W) in the range of 10 to 99 weight % and showing (iii) relation between relaxation time of rubber component measured by pulse NMR at the temperature of 30° C. [$T_{2H}^R(30)$: μs], relaxation time of rubber component measured by pulse MNR at the temperature of 80° C. [$T_{2H}^R(80)$: μs] and the content of insoluble fraction in boiling n-heptane (W) satisfying the following equations:

$$T_{2H}^R(80) \leq 670 - 2.2 \times W$$

$$T_{2H}^R(80)/T_{2H}^R(30) \leq 8.8 + 0.086 \times W,$$

and (B) 90 to 5 weight % of a propylenic random copolymer having intrinsic viscosity [η] measured in decaline at the temperature of 135° C. in the range of 0.5 to 10 deciliter/g and containing 10 to 80 mol % of olefinic units other than the propylenic unit, wherein the homopolymer of propylene and the copolymers of propylene are obtained by homopolymerization or copolymerization of propylene in the presence of a catalyst system comprising (a) a solid component consisting essentially of magnesium, titanium, silicon, a halogen atom or a compound comprising a halogen and dialkyl phthalate, (b) triisobutylaluminum, (c) an aromatic compound containing alkoxy group represented by the following general formula (I):

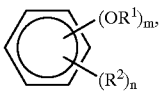

(I)

wherein R$^1$ is an alkyl group having 1 to 20 carbon atoms, R$^2$ is a hydrocarbon group having 1 to 10 carbon atoms, a hydroxyl group or a nitro group, m is an integer of 1 to 6 and n is an integer of 0 to 6 (6−m) and (d) an organosilicon compound.

2. A propylenic resin composition as claimed in claim 1, wherein the propylenic random copolymer (B) contains 10 to 70 mol % of olefinic units other than the propylenic unit.

3. A propylenic resin composition as claimed in claim 1, wherein the intrinsic viscosity [η] of (A) is in the range of 1.0 to 9.0 deciliter/g.

4. A propylenic resin composition as claimed in claim 1, wherein the content of insoluble fraction in boiling n-heptane (W) is in the range of 20 to 99 weight %.

5. A propylenic resin composition as claimed in claim 1, wherein the propylenic resin composition comprises (A) 30 to 95 weight % of at least one kind selected from the group consisting of the homopolymer of propylene and the copolymers of propylene containing 4 mol % or less of other olefinic units.

6. A propylenic resin composition as claimed in claim 1, wherein the propylenic resin composition comprises 70 to 5 weight % of (B) the propylenic random copolymer.

7. A propylenic resin composition as claimed in claim 1, wherein the homopolymer of propylene and the copolymers of propylene are obtained by homopolymerization or copolymerization of propylene in the presence of a catalyst system comprising (a) a solid component consisting essentially of magnesium, titanium, silicon, an iodine atom and diethyl phthalate, (b) triisobutylaluminum, (c) an aromatic compound containing alkoxy group represented by the following general formula (I):

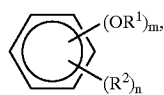
(I)
wherein $R^1$ is an alkyl group having 1 to 20 carbon atoms, $R^2$ is a hydrocarbon group having 1 to 10 carbon atoms, a hydroxyl group or a nitro group, m is an integer of 1 to 6 and n is an integer of 0 to (6−m) and (d) diphenyldimethoxysilane.
* * * * *